United States Patent
Edlinger

(10) Patent No.: US 6,666,996 B1
(45) Date of Patent: Dec. 23, 2003

(54) PROCESS FOR PRODUCING MARL SLAGS

(75) Inventor: Alfred Edlinger, Bartholomaberg (AT)

(73) Assignee: Tribovent Verfahrensentwicklung, GmbH, Loruns (AT)

(*) Notice: Subject to any disclaimer, the term of this patent is extended or adjusted under 35 U.S.C. 154(b) by 0 days.

(21) Appl. No.: 09/890,820

(22) PCT Filed: Dec. 11, 2000

(86) PCT No.: PCT/AT00/00334

§ 371 (c)(1), (2), (4) Date: Aug. 2, 2001

(87) PCT Pub. No.: WO01/46081

PCT Pub. Date: Jun. 28, 2001

(51) Int. Cl.⁷ .......................... B29B 9/00; C04B 35/653
(52) U.S. Cl. .............. 264/5; 264/13; 264/332
(58) Field of Search ............... 264/332, 5, 13

(56) References Cited

U.S. PATENT DOCUMENTS 5,624,493 A * 4/1997 Wagh et al. ................ 106/817

FOREIGN PATENT DOCUMENTS

| DE | 2 322 889 | 11/1974 |
|----|-----------|---------|
| FR | 2 318 834 | 2/1977 |
| GB | 356144 | 9/1931 |
| WO | WO 98/45218 | 10/1998 |

* cited by examiner

*Primary Examiner*—Christopher A. Fiorilla
(74) *Attorney, Agent, or Firm*—Kevin E. Joyce

(57) ABSTRACT

In a process for producing marl slags and marl slag cements or mixed components for mixed cements from marl having a basicity $CaO/SiO_2$ of <2.0, it is provided that in a first process step argillaceous marl or a mixture of marl and clay having a basicity of <2.0 is dried, preheated and calcined and that, after this, the obtained product in a second process step is melted in a separate melting furnace at higher temperatures than applied in the first process step and is granulated from the melt.

11 Claims, No Drawings

PROCESS FOR PRODUCING MARL SLAGS

This application is the National Phase of International Application PCT/AT00/00334 filed Dec. 11, 2000 which designated the U.S., and that International Application was not published under PCT Article 21(2) in English.

BACKGROUND OF THE INVENTION

1. Field of the Invention

The invention relates to a process for producing marl slags and marl slag cements or mixed components for mixed cements from marl having a basicity $CaO/SiO_2$ of <2.0.

2. Prior Art

When producing cement, calcareous and argillaceous stones, in particular limestone and lime marl, are used as starting materials and burned to cement clinker. The lime contained in the starting materials is completely bound to silicic alumina and optionally iron, thus forming the cement minerals usual to portland cement clinker, such as alite, belite, brown millerite and glass. In order to ensure the desired sintering to cement clinker at comparatively low temperatures of about 1350° C., relatively high-quality starting materials and, in particular, highly calcareous lime marl are required. Lime marl, which usually has a basicity of between 3 and 4 and besides lime also contains $SiO_2$, $Al_2O_3$ and iron oxides, however, occurs in nature not only in the form of relatively high-quality and largerly pure lime marl, but rather as a common or low-quality marl in substantially higher amounts. The marl that is substantially more wide-spread is characterized by basicities of between 0.8 and 2 and frequently is found also in the form of argillaceous marl. Those comparatively low-grade, yet substantially more wide-spread starting products in conventional cement production processes cannot be used without expensive purification and lime enrichment procedures and are available in large amounts as cheap raw materials.

Slag cements and, in particular, blast furnace slag cements likewise exhibit hydraulic properties and it has already been demonstrated that, by optimizing the slag chemistry and, in particular, by adjusting basicities and aluminate contents as well as applying special activation procedures, metallurgical slags will be improved to the extent that they correspond to a strength development in concrete and are at least equivalent to clinker cement.

SUMMARY OF THE INVENTION

The present invention aims to render wide-spread and cheap raw material marls having low basicities apt for economic utilization in the production of slag cements or mixed components for mixed cements while, at the same time, allowing for the adaptation of the desired product qualities to the respective requirements to a high degree. To solve this object, the process according to the invention essentially consists in that in a first process step argillaceous marl or a mixture of marl and clay having a basicity of <2.0 is dried, preheated and calcined and that, after this, the obtained product in a second process step is melted in a separate melting furnace at higher temperatures than applied in the first process step and is granulated from the melt. Calcination is an endothermic reaction, whereas melting constitutes an exothermic reaction. Due to the fact that argillaceous marl, i.e. relatively low-grade marl, having an elevated $Al_2O_3$ content or a mixture of low-quality marl and clay having a basicity of below 2 is dried, preheated and calcined in a first process step, it is initially safeguarded that the high amounts of $CO_2$ released during calcining need snot be heated to the temperatures usually required in cement production for sintering. The calcination of hydrate, sulfur and carbonate compounds is, thus, carried out at comparatively low temperatures such that the large gas amounts released occur at accordingly low temperature levels, thus enhancing the thermal efficiency and hence the economy of the process. On account of the relatively low purities of the starting substances used, calcination takes place already at lower temperatures than would be the case with highly pure calcium carbonates. Due to the fact that the obtained product in a second process step is subsequently melted in a separate melting furnace at higher temperatures than in the first process step, there is the possibility to subsequently correct the composition of the melt by any means whatsoever and it is feasible, by appropriately granulating the melt, to provide the desired glass portion and ensure that any undesired crystallization will be largely avoided during cooling. Drying, preheating and calcining in a first process step at accordingly low temperatures, moreover, allows for the use of substantially more coarse-grained charging substances as compared to known cement clinker sintering processes such that raw material preparation and, in particular, grinding will not be required, as a rule, but the coarse charging stock merely will have to be finely broken. The process according to the invention also calls for a substantially lower heat consumption than the clinker process.

Advantageously, the process according to the invention is carried out in a manner that the first process step is realized in a suspension type heat exchanger, a rotary tubular kiln, a multiple-hearth furnace or a shaft furnace, or in a fluidized bed or cyclone preheating unit. In a particularly advantageous manner, a suspension type heat exchanger may be employed, whereby it is feasible, in particular if a rotary tubular kiln or shaft furnace is employed in the first step, to choose an even coarser particle size of the charging stock, drying, preheating and calcining of a charging material having particle sizes of, for instance, up to 40 mm being readily feasible.

In a particularly advantageous manner, the second process step is carried out in a melting cyclone, a rotary tubular kiln or a hearth-type furnace, or in an iron melting oxidation reactor, whereby even the formation of foamed slag may be advantageous if a meltdown oxidation reactor is employed.

What is essential in obtaining the desired cement technological properties, after all, is the adjustment of the slag basicity of the target slag, it being advantageously proceeded in a manner that the target slag is adjusted to a basicity $CaO/SiO_2$ of between 0.9 and 1.85 by mixing marl and clay. If, at the same time, an $Al_2O_3$ content of between 6 and 20 wt.-% is aimed at, a high-quality synthetic blast furnace slag will be obtained, such $Al_2O_3$ contents being obtainable in a particularly simple manner by using argillaceous marls. When using other marl qualities for the main component, the desired slag chemistry may be adjusted by the aid of bauxite, clays, flue ashes or other industrial waste substances such as, for instance, red muds, sweepings, corundum-containing grinding dusts or refractory break-offs.

What is also essential for obtaining the desired cement technological properties is, of course, accordingly rapid cooling so as to prevent the formation of crystals. Depending on the basicity of the slag, the slag is characterized by different viscosities, wherein the slag becomes highly viscous, in particular, at basicities of above 1.4, and the formation of crystals can no longer be reliably prevented in conventional granulation processes such as, for instance, during granulation in hot-water. In the context of the invention it is, therefore, advantageously proceeded in a manner that the melt at basicities of >1.4 is sprayed into a granulator and, in particular, a vapor granulator. Spray granulation, in which the cooling of the molten droplets in most cases is effected by nozzling in water or water vapor, may be substantially improved even further in that hydrocarbon is additionally nozzled into the spray granulator. The thermal decomposition of hydrocarbon withdraws heat from the sprayed droplets at a cooling gradient of $10^4$ to $10^5$ K/s while simultaneously forming high-quality synthesis gas, which, as in correspondence with a preferred further development of the process according to the invention, can be burned in the first process step, because the actual heat demand for calcination arises there.

Since, due to the relatively low purity of the starting materials, calcination takes place at relatively low temperatures, the process according to the invention advantageously is carried out in a manner that the first process step is carried out at temperatures of up to 950° to 1000° C., drying being effected at temperatures of from 100 to 210° C., preheating being effected at 210° to 600° C. and calcining being effected at 600° to 100° C.

In the second process step, in which the slag is melted in order to subsequently solidify under the formation of a glassy consistency, it is advantageously proceeded in a manner that operation takes place at final temperatures of between 1450° and 1550° C.

As already mentioned, the process according to the invention stands out for obviating any cumbersome raw material preparation and, in particular, for not requiring any grinding of the starting materials. Advantageously, the process according to the invention is carried out in a manner that the first process step is realized with finely broken marl having a mean particle size ranging from 20 mm to 30 mm.

In order to further enhance the cement technological properties, it may be proceeded according to the invention in that by-pass dust from the production of clinker is added to the charging material. Since a slag melt is produced within the context of the process according to the invention, it is thus feasible to introduce into the melt the high alkali content contained in the clinker production by-pass dust, a thus formed product being particularly reactive and characterized by high early strengths. Clinker raw materials as are used in the conventional cement production process, as a rule, are characterized by high alkali contents, and the processing of such alkali-rich raw materials, as a rule, constitutes a problem of disposal, which can be solved by the process according to the invention. Also the use of other industrial alkali-containing waste substances, for instance, those from paper and cellulose pulp production, which partially include also high portions of $Al_2O_3$, as well as of organic matter such as lignin, whose calorific value may be utilized, is advantageous.

If the melt is to be subjected to a conventional water granulation procedure, its basicity must be lowered to below 1.4, whereby in those cases the $Al_2O_3$ content of the target slag must be increased accordingly in order to achieve a march of strength similar to clinker, of the end product.

In the context of the process according to the invention, the use of charging materials having elevated dolomite contents has no adverse effects, either, it merely having to be taken care that the MgO portion of the charging material is adjusted to below 19 wt.-%. Up to those amounts, magnesium oxide is able to enhance the granulating capacity due to the reduced slag viscosity, which will lead to an increased portion of amorphous or glassy particles.

DETAILED DESCRIPTION OF PREFERRED EMBODIMENTS OF THE INVENTION

In the following, the process according to the invention will be explained in more detail by way of exemplary embodiments.

EXAMPLE 1

A marl slag is produced of the charging materials marl and clay. The starting materials had the following directional analysis:

| Component (%) | Marl | Clay |
|---|---|---|
| Loss on ignition | 32.5 | 12.5 |
| $SiO_2$ | 23 | 46 |
| $Al_2O_3$ | 4 | 24 |
| $Fe_2O_3$ | 2 | 15 |
| CaO | 33 | 0.72 |
| MgO | 3 | 0.33 |
| $SO_3$ | 1 | — |
| $K_2O$ | 0.5 | — |
| $Na_2O$ | 0.2 | 0.1 |
| $TiO_2$ | 0.4 | 1 |
| Sum | 99.6 | 99.7 |
| C/S | 1.4348 | 0.0157 |

The starting materials were supplemented with clinker furnace by-pass dust, whereby the early strength of the marl slag was significantly increased.

In order to adjust the slag basicity $CaO/SiO_2$ to below 1.4 so as to apply conventional water granulation, the portions of the two components in the mixture were determined as follows with a target basicity of 1.1 having been sought:

$$\text{Marl portion } (x) = \frac{(C/S) \cdot SiO_2 \, (clay) - CaO \, (clay)}{CaO \, (marl) - (C/S) \cdot SiO_2 \, (marl)}$$

$$\text{Marl portion } = \frac{1.1 \cdot 46 - 0.72}{33 - 1.1 \cdot 23} = 6.48$$

Thus, one part of clay was mixed with 6.48 parts of marl, which resulted in a mixture of 86.6 wt.-% marl and 13.4 wt.-% clay. After this, the crude mixture for the intended marl slag had the following composition:

| Marl slag | |
|---|---|
| Component | Portion (%) |
| $SiO_2$ | 37.4 |
| $Al_2O_3$ | 9.6 |
| $Fe_2O_3$ | 5 |
| CaO | 41.2 |
| MgO | 3.8 |
| $SO_3$ | 1.2 |
| $K_2O$ | 0.6 |
| $Na_2O$ | 0.3 |
| $TiO_2$ | 0.7 |
| Sum | 99.8 |
| C/S | 1.1 |

After drying at 100° to 210° C., preheating at 210° to 600° C. and calcining at 600° to 950° C., the dried and calcined product was drawn off a suspension type heat exchanger and introduced into a melting cyclone. Within the melting cyclone, the temperature was adjusted to between 1450° and 1550° C., whereupon the melt was granulated in hot water.

In order to reduce the nitrogen oxide portion, it is also feasible to realize a progressive postcombustion within the suspension type heat exchanger by blowing in combustion air, thereby improving the thermal efficiency. The fuel used in the melting cyclone in an alternative process conduct, in which the melt was ejected into a spray granulator, was formed by using hydrocarbons during granulation, the cracked gas or synthesis gas formed having been used as a fuel together with air in the melting cyclone. Moreover, this method of granulation caused the iron oxide of the slag to be practically completely metallized and separated by a subsequent magnetic separation of the slag.

EXAMPLE 2

Using a rotary tubular kiln in the first process step and a hearth-type furnace in the second process step, finely broken marl having a particle size of about 25 mm was used. The marl slag had the following composition:

| Marl slag | |
| --- | --- |
| Component | Portion (%) |
| $SiO_2$ | 34.6 |
| $Al_2O_3$ | 6 |
| $Fe_2O_3$ | 3 |
| CaO | 49.6 |
| MgO | 2 |
| $K_2O$ | 0.7 |
| $Na_2O$ | 0.3 |
| $TiO_2$ | 0.6 |
| Sum | 96.8 |

Due to the relatively high basicity of 1.43, the slag was disintegrated by spraying into a spray granulator, whereby a high portion of fine granulates was obtained. On account of the high basicity, the high portion of fine granulates was characterized by a particularly high hydraulic activity. Such a slag having a basicity of 1.43 could no longer be successfully granulated with hot water, since the portion of fines, which is important from a cement technological point of view, was hydraulically inactivated on account of the belite crystal formation.

What is claimed is:

1. A process for producing marl slags and marl slag cements, or mixed components for mixed cements, from marl having a basicity $CaO/SiO_2$ of <2.0, wherein:

in a first process step argillaceous marl, or a mixture of marl and clay, having a basicity of <2.0 is dried, preheated and calcined; and thereafter, in a second process step, the product obtained in the first process step is melted in a separate melting furnace at a higher temperature than applied in the first process step and is granulated from the melt.

2. A process according to claim 1, wherein the first process step is realized in a suspension heat exchanger, a rotary tubular kiln, a multiple-hearth furnace, a shaft furnace, or a fluidized bed or cyclone preheating unit.

3. A process according to claim 1 or 2, wherein the second process step is carried out in a melting cyclone, a rotary tubular kiln, a hearth furnace, or in an iron melting oxidation reactor.

4. A process according to claim 1, wherein a target slag is adjusted to a basicity $CaO/SiO_2$ of between 0.9 and 1.85 by mixing marl and clay.

5. A process according to claim 1, wherein the melt at basicities of >1.4 is sprayed into a vapor granulator.

6. A process according to claim 1, wherein the first step is carried out at temperatures not exceeding 1000°, drying being effected at temperatures in a range from 100 to 210°, preheating being effected in a range from 210° to 600° C. and calcining being effected in a range from 600° to 1000° C.

7. A process according to claim 1 or 6, wherein the second process step is carried out at temperatures between 1450° and 1550° C.

8. A process according to claim 1, wherein the first process step is realized with finely broken marl having a mean particle size ranging from 20 mm to 30 mm.

9. A process according to claim 1, wherein bypass dust from the production of clinker is included in the material processed in the first process step.

10. A process according to claim 1, wherein any MgO portion of the material processed in the first process step is adjusted to below 19 wt.-%.

11. A process according to claim 1, wherein granulation in the second process step is effected by spray granulation using hydrocarbons as a coolant and synthetic gas formed during granulation is burned in the first process step.

* * * * *